(12) United States Patent
    Thiebaut et al.

(10) Patent No.: US 11,382,164 B2
(45) Date of Patent: Jul. 5, 2022

(54) METHOD AND APPARATUS FOR TERMINALS REGISTERED VIA MULTIPLE ACCESS NETWORKS

(71) Applicants: ALCATEL LUCENT S.A.S., Nozay (FR); NOKIA TECHNOLOGIES OY, Espoo (FI)

(72) Inventors: Laurent Thiebaut, Nozay (FR); Curt Wong, Bellevue, WA (US); Sung Hwan Won, Seoul (KR); Nicolas Drevon, Nozay (FR)

(73) Assignees: ALCATEL LUCENT S.A.S., Nozay (FR); NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/611,418

(22) PCT Filed: May 7, 2018

(86) PCT No.: PCT/EP2018/061739
    § 371 (c)(1),
    (2) Date: Nov. 6, 2019

(87) PCT Pub. No.: WO2018/206516
    PCT Pub. Date: Nov. 15, 2018

(65) Prior Publication Data
    US 2020/0170068 A1    May 28, 2020

Related U.S. Application Data

(60) Provisional application No. 62/503,158, filed on May 8, 2017.

(51) Int. Cl.
    *H04W 76/27*    (2018.01)
    *H04W 4/14*     (2009.01)
    (Continued)

(52) U.S. Cl.
    CPC ............ *H04W 76/27* (2018.02); *H04W 4/14* (2013.01); *H04W 8/22* (2013.01); *H04W 68/02* (2013.01); *H04W 68/12* (2013.01); *H04W 88/06* (2013.01)

(58) Field of Classification Search
    CPC ......... H04W 76/27; H04W 4/14; H04W 8/22; H04W 68/02; H04W 68/12; H04W 88/06
    (Continued)

(56) References Cited

U.S. PATENT DOCUMENTS

| 2008/0259912 | A1* | 10/2008 | Wang | ..................... H04W 68/12 370/356 |
| 2009/0116447 | A1 | 5/2009 | Balasubramanian et al. | |

(Continued)

FOREIGN PATENT DOCUMENTS

| CN | 101541076 A | 9/2009 |
| CN | 103916924 A | 7/2014 |

(Continued)

OTHER PUBLICATIONS 23.501: Paging a UE Via 3GPP Access for re-Activating PDU Sessions in Non-3GPP Access, Nokia et al., vol. SA WG2, No. Hangzhou; May 15, 2017-May 19, 2017 (May 9, 2017) 3 pages.
TS 23.502: SMS Over NAS Over Non 3GPP Access, Nokia et al., 3GPP Draft; S2-173621WAS415 203.502-SMSOVERNON3GPP-V2, vol. SA WG2, No. Hangzhou (May 20, 2017) 6 pages.

(Continued)

*Primary Examiner* — Inder P Mehra
(74) *Attorney, Agent, or Firm* — Alston & Bird LLP (57) ABSTRACT

The apparatus includes a processor configured to send, over a 3rd Generation Partnership project (3GPP) access, a notifying message regarding non-3GPP access to a user equipment, the user equipment being simultaneously registered to the communication network via the 3GPP access and via the non-3GPP access, the user equipment being in a connection management-idle state over the non-3GPP access. The method includes sending over a 3rd Generation Partnership (Continued)

project (3GPP) access a notifying message regarding non-3GPP access to a user equipment, the user equipment being simultaneously registered to a communication network via the 3GPP access and via the non-3GPP access, the user equipment being in a connection management-idle state over the non-3GPP access.

34 Claims, 5 Drawing Sheets

(51) Int. Cl.
    *H04W 8/22* (2009.01)
    *H04W 68/02* (2009.01)
    *H04W 68/12* (2009.01)
    *H04W 88/06* (2009.01)

(58) Field of Classification Search
    USPC .......................................................... 370/331
    See application file for complete search history.

(56) References Cited

U.S. PATENT DOCUMENTS

| | | | | |
|---|---|---|---|---|
| 2013/0324170 | A1* | 12/2013 | Watfa | H04W 4/14 455/466 |
| 2014/0378172 | A1* | 12/2014 | Lim | H04W 68/12 455/458 |
| 2015/0327206 | A1* | 11/2015 | Rahman | H04W 80/00 370/338 |
| 2016/0183085 | A1* | 6/2016 | Yerrabommanahalli | H04W 12/04 713/153 |
| 2020/0092790 | A1* | 3/2020 | Salkintzis | H04L 45/306 |

FOREIGN PATENT DOCUMENTS

| | | |
|---|---|---|
| JP | 2007-510366 A | 4/2007 |
| WO | WO 2016/028558 A1 | 2/2016 |

OTHER PUBLICATIONS

3GPP TS 23.040 V15.3.0, $3^{rd}$ Generation Partnership Project; Technical Specification Group Core Network and Terminals; Technical Realization of the Short Message Service (SMS) (Release 15) (Mar. 2019) 216 pages.
3GPP TS 23.501 V0.4.0, $3^{rd}$ Generation Partnership Project; Technical Specification Group Services and System Aspects; System Architecture for the 5G System; Stage 2 (Release 15) (Apr. 2017) 124 pages.
3GPP TS 23.502 V0.3.0, $3^{rd}$ Generation Partnership Project; Technical Specification Group Services and System Aspects; Procedures for the 5G System; Stage 2 (Release 15) (Mar. 2017) 116 pages.
International Search Report and Written Opinion for Application No. PCT/EP2018/061739 dated Jul. 13, 2018, 19 pages.
Office Action for Vietnamese Application No. 1-2019-06901 dated Dec. 26, 2019, 2 pages.
Office Action for Japanese Application No. 2019-561739 dated Dec. 10, 2020, with English translation, 12 pages.
SA WG2 Meeting #121; S2-173294; May 15-18, 2017, Hangzhou, P.R. China; Source: Nokia, Alcatel-Lucent Shanghai Bell; 23.501: Title: Paging a UE Via 3GPP Access For Re-Activating PDU Sessions In Non-3GPP Access; Document For: Approval; Agenda Item: 6.5.10; Work Item/Release: 5GS_Ph1/Rel-15; 6 pages.
SA WG2 Meeting #121; S2-173621 (revision of S2-173416); May 15-19, 2017, Hangzhou, China; Source: Nokia, Alcatel-Lucent Shanghai Bell; Title: T8 23.502; SMS Over NAS Over Non 3GPP Access; Document For: Discussion and Approval; Agenda Item: 6.5.8.1; Work Item/Release: 5G ph1/Rel-15, 13 pages.
SA WG2 Meeting #S2-119; S2-170738; Feb. 13-17, 2017, Dubrovnik, Croatia; Source: Qualcomm Incorporated; Title: 23.501: Mobility Management Model for Non-3GPP Accesses; Approval; 6.5.1; 5GS_Ph1/Rel15, 16 pages.
Office Action for Indian Application No. 201947049837 dated May 28, 2021, 6 pages.
Office Action for Chinese Application No. 201880039658.X dated Jun. 7, 2021, 9 pages.
Office Action for Chinese Application No. 201880039658.X dated Jan. 28, 2022.

* cited by examiner

METHOD AND APPARATUS FOR TERMINALS REGISTERED VIA MULTIPLE ACCESS NETWORKS

CROSS-REFERENCE TO RELATED APPLICATIONS

The present application is a national phase entry of International Application No. PCT/EP2018/061739, filed May 7, 2018, which claims priority to U.S. Provisional Application No. 62/503,158, filed on May 8, 2017, the contents of which are incorporated herein by reference in its entirety.

BACKGROUND

Field

Example embodiments relate generally to a registration of a user equipment (UE) in a communication network.

Related Art

In a communication access network, a user equipment (UE) must register with the network prior to conducting data communications. The registration process ensures the security of the data communications for the UE while protecting the integrity of the network for service providers.

SUMMARY

At least one example embodiment is directed towards a network node in a communication network.

In one embodiment, the network node includes at least one processor; and at least one memory storing instructions that, when executed by the at least one processor, causes the network node to, send, over a $3^{rd}$ Generation Partnership project (3GPP) access, a notifying message regarding non-3GPP access to a user equipment, the user equipment being simultaneously registered to the communication network via the 3GPP access and via the non-3GPP access, said user equipment being in a connection management-idle state over the non-3GPP access.

In one embodiment, said notifying message includes a paging message if the user equipment is also in a connection management-idle state over the 3GPP access.

In one embodiment, said notifying message includes a non-access stratum signaling message if the user equipment is in a connection management-connected state over the 3GPP access.

At least another example embodiment is directed toward a network node.

In one embodiment, the network node includes at least one processor; and at least one memory storing instructions that, when executed by the at least one processor, cause the network node to, send, over a non-$3^{rd}$ Generation Partnership project (3GPP) access, a notifying message regarding a 3GPP access to a user equipment, the user equipment being simultaneously registered to a communication network via the 3GPP access and via the non-3GPP access, said user equipment being in a connection management-idle state over the 3GPP access and in a connection management-connected state over the non-3GPP access, and receive, over the 3GPP access, a service request message.

At least another example embodiment is directed toward a network node.

In one embodiment, the network node includes at least one processor; and at least one memory storing instructions that, when executed by the at least one processor, cause the network node to, receive a registration request indicating that short message service messages can be delivered to a user equipment via multiple access types, send a registration accept message confirming that short message service messages are allowed to be delivered via multiple access types.

In one embodiment, the multiple access types include a $3^{rd}$ generation partnership project (3GPP) access and a non-3GPP access.

At least another example embodiment is directed toward a user equipment in a communication network.

In one embodiment, the user equipment includes at least one processor, and at least one memory storing instructions that, when executed by the at least one processor, causes the user equipment to, receive, over a $3^{rd}$ Generation Partnership project (3GPP) access, a notifying message regarding non-3GPP access, the user equipment being simultaneously registered to the communication network via the 3GPP access and via the non-3GPP access, said user equipment being in a connection management-idle state over the non-3GPP access.

In one embodiment, said notifying message includes a paging message if the user equipment is also in a connection management-idle state over the 3GPP access.

In one embodiment, said notifying message includes a non-access stratum signaling message if the user equipment is in a connection management-connected state over the 3GPP access.

At least another example embodiment is directed toward a user equipment.

In one embodiment, the user equipment includes at least one processor; and at least one memory storing instructions that, when executed by the at least one processor, cause the user equipment to, receive, over a non-$3^{rd}$ Generation Partnership project (3GPP) access, a notifying message regarding a 3GPP access, the user equipment being simultaneously registered to a communication network via the 3GPP access and via the non-3GPP access, said user equipment being in a connection management-idle state over the 3GPP access and in a connection management-connected state over the non-3GPP access, and send, over the 3GPP access, a service request message.

At least another example embodiment is directed toward a user equipment.

In one embodiment, the user equipment includes at least one processor; and at least one memory storing instructions that, when executed by the at least one processor, cause the user equipment to, send a registration request indicating that short message service messages can be delivered to the user equipment via multiple access types, receive a registration accept message confirming that short message service messages are allowed to be delivered via multiple access types.

In one embodiment, the multiple access types include a $3^{rd}$ generation partnership project (3GPP) access and a non-3GPP access.

At least another example embodiment is directed toward a method.

In one embodiment, the method includes sending over a $3^{rd}$ Generation Partnership project (3GPP) access, by at least one first processor of a network node, a notifying message regarding non-3GPP access to a user equipment, the user equipment being simultaneously registered to a communication network via the 3GPP access and via the non-3GPP access, the user equipment being in a connection management-idle state over the non-3GPP access.

In one embodiment, said notifying message includes a paging message if the user equipment is also in a connection management-idle state over the 3GPP access.

In one embodiment, said notifying message includes anon-access stratum signaling message if the user equipment is in a connection management-connected state over the 3GPP access.

At least another example embodiment is directed toward a method.

In one embodiment, the method includes sending over a non-$3^{rd}$ Generation Partnership project (3GPP) access, by at least one first processor of a network node, a notifying message regarding a 3GPP access to a user equipment, the user equipment being simultaneously registered to a communication network via the 3GPP access and via the non-3GPP access, said user equipment being in a connection management-idle state over the 3GPP access and in a connection management-connected state over the non-3GPP access, and receiving over the 3GPP access, by the at least one first processor, a service request message.

At least another example embodiment is directed toward a method.

In one embodiment, the method includes receiving, by at least one first processor of a network node, a registration request indicating that short message service messages can be delivered to a user equipment via multiple access types, sending, by the at least one first processor, a registration accept message confirming that short message service messages are allowed to be delivered via multiple access types.

In one embodiment, the multiple access types include a $3^{rd}$ generation partnership project (3GPP) access and a non-3GPP access.

At least another example embodiment is directed toward a method.

In one embodiment, the method includes receiving over a $3^{rd}$ Generation Partnership project (3GPP) access, by at least one first processor of a user equipment, a notifying message regarding non-3GPP access, the user equipment being simultaneously registered to a communication network via the 3GPP access and via the non-3GPP access, the user equipment being in a connection management-idle state over the non-3GPP access.

In one embodiment, said notifying message includes a paging message if the user equipment is also in a connection management-idle state over the 3GPP access.

In one embodiment, said notifying message includes a non-access stratum signaling message if the user equipment is in a connection management-connected state over the 3GPP access.

At least another example embodiment is directed towards a method.

In one embodiment, the method includes receiving over a non-$3^{rd}$ Generation Partnership project (3GPP) access, by at least one first processor of a user equipment, a notifying message regarding a 3GPP access, the user equipment being simultaneously registered to a communication network via the 3GPP access and via the non-3GPP access, said user equipment being in a connection management-idle state over the 3GPP access and in a connection management-connected state over the non-3GPP access, and sending over the 3GPP access, by the at least one first processor, a service request message.

At least another example embodiment is directed towards a method.

In one embodiment, the method includes sending, by at least one first processor of a user equipment, a registration request indicating that short message service messages can be delivered to the user equipment via multiple access types, receiving, by the at least one first processor, a registration accept message confirming that short message service messages are allowed to be delivered via multiple access types.

In one embodiment,
the multiple access types include a $3^{rd}$ generation partnership project (3GPP) access and a non-3GPP access.

At least one example embodiment is directed towards a computer program.

In one embodiment, the computer program includes computer readable instructions for causing an apparatus to perform at least the following, sending over a $3^{rd}$ Generation Partnership project (3GPP) access, by at least one first processor of a network node, a notifying message regarding non-3GPP access to a user equipment, the user equipment being simultaneously registered to a communication network via the 3GPP access and via the non-3GPP access, the user equipment being in a connection management-idle state over the non-3GPP access.

In one embodiment, the computer program includes computer readable instructions for causing an apparatus to perform at least the following, sending over a non-$3^{rd}$ Generation Partnership project (3GPP) access, by at least one first processor of a network node, a notifying message regarding a 3GPP access to a user equipment, the user equipment being simultaneously registered to a communication network via the 3GPP access and via the non-3GPP access, said user equipment being in a connection management-idle state over the 3GPP access and in a connection management-connected state over the non-3GPP access, and receiving over the 3GPP access, by the at least one first processor, a service request message.

In one embodiment, the computer program includes computer readable instructions for causing an apparatus to perform at least the following, receiving, by at least one first processor of a network node, a registration request indicating that short message service messages can be delivered to a user equipment via multiple access types, sending, by the at least one first processor, a registration accept message confirming that short message service messages are allowed to be delivered via multiple access types.

In one embodiment, the computer program includes computer readable instructions for causing an apparatus to perform at least the following, receiving over a $3^{rd}$ Generation Partnership project (3GPP) access, by at least one first processor of a user equipment, a notifying message regarding non-3GPP access, the user equipment being simultaneously registered to a communication network via the 3GPP access and via the non-3GPP access, the user equipment being in a connection management-idle state over the non-3GPP access.

In one embodiment, the computer program includes computer readable instructions for causing an apparatus to perform at least the following, receiving over a non-$3^{rd}$ Generation Partnership project (3GPP) access, by at least one first processor of a user equipment, a notifying message regarding a 3GPP access, the user equipment being simultaneously registered to a communication network via the 3GPP access and via the non-3GPP access, said user equipment being in a connection management-idle state over the 3GPP access and in a connection management-connected state over the non-3GPP access, and sending over the 3GPP access, by the at least one first processor, a service request message.

In one embodiment, the computer program includes computer readable instructions for causing an apparatus to perform at least the following, sending, by at least one first processor of a user equipment, a registration request indicating that short message service messages can be delivered to the user equipment via multiple access types, receiving, by the at least one first processor, a registration accept message confirming that short message service messages are allowed to be delivered via multiple access types.

DETAILED DESCRIPTION

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments are described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing endpoints, clients, gateways, nodes, agents, controllers, computers, cloud based servers, web servers, proxies or proxy servers, application servers, and the like. As discussed later, such existing hardware may include, inter alia, one or more Central Processing Units (CPUs), system-on-chip (SOC) devices, digital signal processors (DSPs), application-specific-integrated-circuits, field programmable gate arrays (FPGAs) computers or the like.

Although a flow chart or communication flow diagram may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

The terms "including" and/or "having", as used herein, are defined as comprising (i.e., open language). The term "coupled", as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, clients, gateways, nodes, agents controllers, computers, cloud based servers, web servers, application servers, proxies or proxy servers, and the like, may be (or include) hardware, firmware, hardware executing software or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs) computers or the like configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

The endpoints, clients, gateways, nodes, agents, controllers, computers, cloud based servers, web servers, application servers, proxies or proxy servers, and the like, may also include various interfaces including one or more transmitters/receivers connected to one or more antennas, a computer readable medium, and (optionally) a display device. The one or more interfaces may be configured to transmit/receive (wireline and/or wirelessly) data or control signals via respective data and control planes or interfaces to/from one or more network elements, such as switches, gateways, termination nodes, controllers, servers, clients, and the like.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

Example embodiments may be utilized in conjunction with various telecommunication networks and systems, such as the following (where this is only an example list): Universal Mobile Telecommunications System (UMTS); Global System for Mobile communications (GSM); Advance Mobile Phone Service (AMPS) system; the Narrowband AMPS system (VAMPS); the Total Access Communications System (TAGS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); Ultra Mobile Broadband (UMB); $3^{rd}$ Generation Partnership Project LTE (3GPP LTE); and 5G networks.

General Methodology:

A $5^{th}$ Generation System (5GS) allows a user equipment (UE) to register via multiple access networks. The types of the access networks include a $3^{rd}$ Generation Partnership Project (3GPP) access network and non-3GPP access networks. When the UE is registered to a single public land mobile network (PLMN) via multiple access networks, a serving function of the UE in the $5^{th}$ Generation Core (5GC) should be unique. That is to say, both the 3GPP access network and the non-3GPP access network should choose a same access and mobility management function (AMF, as defined in 3GPP TS 23.501), where this feature is a key difference from mobile communication systems of other generations (such as an evolved packet sharing (EPS) network). Within an EPS network, if the UE is using multiple access networks, the UE is required to have two serving functions within the evolved packet core (EPC): a MME in the case of the 3GPP access network and an evolved packet data gateway (ePDG) in case of a non-3GPP (=trusted) access network.

Within the 5GC, in a scenario where the UE is registered via multiple access networks, the AMF must use a proper access network to deliver a downlink (DL) message that is received from other network functions (NF) of the 5G Core and that targets a UE.

The AMF is responsible for forwarding DL messages between the UE and the other network functions, for example (non-exhaustive description): non-access stratum (NAS) session management (SM) messages exchanged with the SMF and short message service (SMS) messages exchanged with a SMS function (SMSF). It is necessary to ensure that DL signaling is sent over a relevant access by taking into account the following:

I. A signaling transaction should be served by a unique access; and/or

II. Service policies in the UE and in the communication network.

Example embodiments provide a method of delivering an SM message via an appropriate access network which is decided by an entity other than AMF and to transport an SMS message via an access network that selected by the AMF.

Delivery of SM messages must be supported in 5GS for data services, where this is one of the most important services to users within 5G. Transport of SMS messages must be supported in 5GS for SMS message exchanges. It is expected that SMS service will still have a use in 5G.

Scenario 1: Non-Stratum Signaling (NAS) SM Messages:

A protocol data unit (PDU) session may be constrained by user/operator policies to use a specific access network. These policies may relate to subscription/tariff constraints or service delivery policies (where service requirements, such as delays, can only be met on some access networks such as 3GPP access, as an example).

Scenario 2: SMS Messages:

On the other hand, differing industry views exist on whether an SMS message should be associated with a certain access network. One of the views is that, since the AMF invokes SMS activation service from the SMSF during a registration procedure, which involves a single access network, the SM messages should be delivered via the single access network, only. In this scenario the access network, through which the SMS message should be delivered, is selected by the UE and SMSF, and not the AMF. Another industry view is that, because the delivery of a SMS message does not necessarily include the user plane of an access network, any access network can be chosen to forward the SMS message delivery. In this scenario, the access network through which the SM message is delivered should be selected by the UE and AMF.

In the example embodiments, a method is provided to deliver an SM message via an appropriate access network that is decided by entities other than AMF, where an SMS message is transported via an access network that is selected by the AMF. The scenario where the SMS message is delivered via an access network that is decided by entities other than AMF may conform the scenario where an SM message is delivered via an appropriate access network that is decided by entities other than AMF. Furthermore, the example embodiment can be easily extended to other type of messages (for example location service messages).

Structural Example Embodiments

Figure 1:
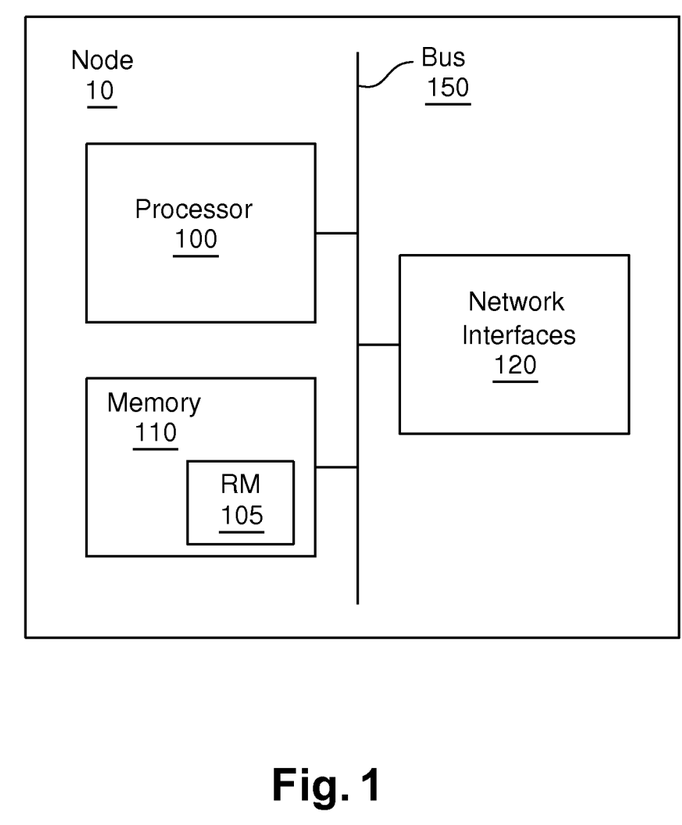
FIG. 1 illustrates a network node, in accordance with an example embodiment.

FIG. 1 illustrates a network node 10, in accordance with an example embodiment. The network node 10 includes the structure for an apparatus, such as a user equipment (UE) 10, as shown in FIGS. 2-5. However, this same structure is also applicable to the network side electronic device of FIGS. 2-5 that include the AMF 20, SMF 30, SMSF 40, etc. As shown in FIG. 1, the network node 10 is a processing device that includes a processor (CPU) 100, a memory 110, a network interface 120 and a bus 150. It will be appreciated that the processing device may include additional components, which have not been described for the sake of brevity.

The processor 100 may be, but not limited to, a central processing unit (CPU), a controller, and arrest medic logic unit (ALU), a digital signal processor, a microcomputer, a field programmable gate array (FPGA), an Application Specific Integrated Circuit (ASIC), a System-on-Chip (SoC), a programmable logic unit, a microprocessor, or any other device capable of performing operations in a defined manner.

The memory 110 may be a computer readable storage medium that generally includes a random access memory (RAM), read only memory (ROM), and/or a permanent mass storage device, such as a disk drive or solid state drive. The memory 110 also stores an operating system and any other routines/modules/applications for providing the functionalities of the processing device 100. These software components may also be loaded from a separate computer readable storage medium into the memory 110 using a drive mechanism (not shown). Such separate computer readable storage medium may include a disc, tape, DVD/CD-ROM drive, memory card, or other like computer readable storage medium (not shown). In some example embodiments, software components may be loaded into the memory 110 via one or more interfaces (not shown), rather than via a computer readable storage medium. It will be appreciated that the processing device may include more than one memory and more than one type of memory. The memory 110 has a registration module (RM) 105 that includes a set of computer-readable instructions that are to be performed by the processor 100 for the purpose of registration. In particular, these computer-readable instructions of the RM 105 command the processor 100 to perform any or all of the method steps disclosed herein, and in particular any or all of the method steps described in relation to FIGS. 2-5.

The network interfaces 120 may include various interfaces including one or more transmitters/receivers (or transceivers) connected to one or more antennas or wires to wirelessly or wiredly transmit/receive control and data signals. The transmitters may be devices that include hardware and software for transmitting signals including, for example, control signals or data signals via one or more wired and/or wireless connections to other network elements over a network. Likewise, the receivers may be devices that include hardware and software for receiving signals including, for example, control signals or data signals via one or more wired and/or wireless connections to other network elements over the network.

In some example embodiments, the processing device (network node) 10 may be configured to execute computer-readable instructions stored in the memory 110 in order to perform one or more of the network side functions/functionalities, etc. discussed herein (e.g., AMF, SMF, etc.). In another example embodiment, the processing device 10 may be configured to execute computer-readable instructions stored in the memory 110 in order to perform the function/functionalities of the UE 10. Furthermore, based on the above description of various example embodiments, it will be readily appreciated that the example embodiments may be implemented on network side and/or on the user equipment side.

Specific Example Embodiments of a Method

Scenario 1: Non-Access Stratum (NAS) SM Messages

The following assumptions are included for this scenario.

I. An UE is said to be connection management (CM)-CONNECTED over an access if, between the UE and the 5GC, there is a signaling path that uses this access.

II. An UE cannot be paged over non-3GPP access. That is to say, the UE cannot be paged over the Internet.

III. A PDU session identifier identifies a PDU session, which is the 5GC equivalent of a packet data network (PDN) connection used in the evolved packet core (EPC). A PDU session allows the UE to have a connectivity with a data network via the 5GC.

In general, when the AMF forwards uplink (UL) signaling to another network function (NF), the AMF indicates the identity of the UE, as well as the access type for the access used to receive this message. The other NF (for example, SMF) is responsible for ensuring that a given transaction is entirely carried out on the same access (for example, if the UE has issued a request on an access, the other NF is responsible for ensuring that the network response to the UE is sent on the same access).

More specifically, session management (SM) entities (such as UE and SMF) are responsible for ensuring that SM messages are delivered via an appropriate access network (for example when the PDU session is constrained by user/operator policies to use a specific access, while the UE is reachable for signaling on multiple accesses).

Figure 2:
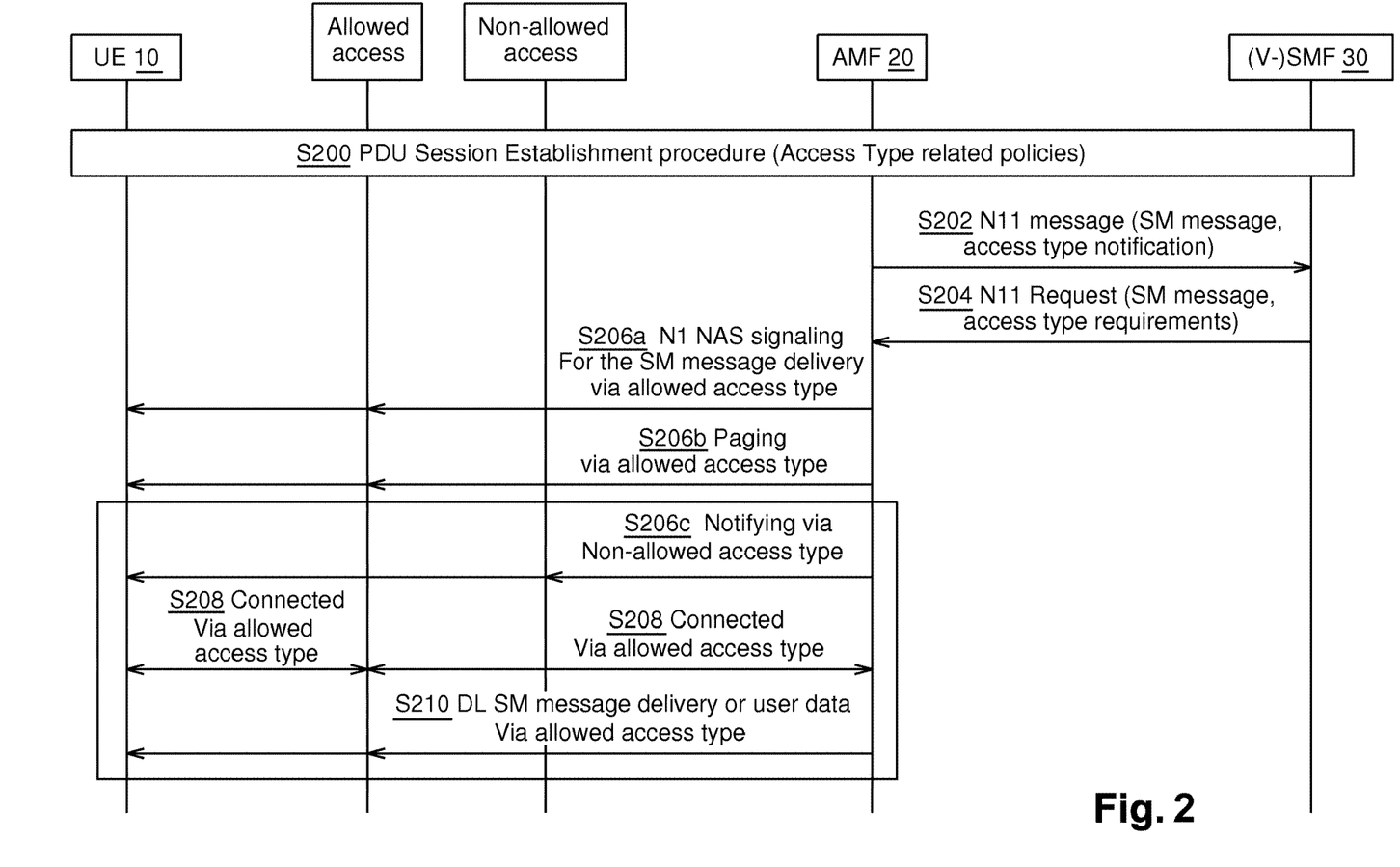
FIG. 2 illustrates a communication diagram for a method of a session management procedure, in accordance with an example embodiment.

FIG. 2 illustrates a communication diagram for a method of a session management procedure, in accordance with an example embodiment. This method is described as being performed by the processor 100 of the network node (processing device) 10 of FIG. 1, though it should be understood that, within the context of this description, a collection of processors 100 are performing these steps. Namely, the processors 100 for each of the apparatus or UE 10, AMF 20 and SMF 30 are collectively performing the steps of this method.

In step S200, the processors 100 of the UE 10 and SMF 30 negotiate the policy associated with the access type(s) over which the PDU session may run in order to perform a PDU session establishment procedure and/or other SM procedure (e.g. PDU session modification procedure). This may correspond to a policy allowing only a specific set of access type(s) or to a policy allowing any access types.

The processor 100 of the UE 10 may include an indication whether the PDU sessions is allowed to use (and thus to exchange of the associated SM signaling) a specific set of access type(s) or over any access types) in an SM message (e.g. a PDU session establishment request message if the SM procedure is the PDU session establishment procedure). The corresponding network policies may be provided.

I.A. by the unified data management (UDM) to the SMF as part of subscription data sent over N10 (interface between UDM/SMF); and/or I.B. by the PCF to the SMF as part of policy rules sent over N7 (interface between PCF/SMF).

During the SM procedure, the processor 100 of SMF 30 may decide the policy for the PDU session by taking into account information received from the processor 100 of the UE 10, the unified data management (UDM), and/or policy charging function (PCF) and indicate to the processor 100 of the UE 10 of the decided policy.

In step S202, when there is an occasion where the processor 100 of the AMF 20 should forward an UL message from the UE 10 to SMF 30, the processor 100 provides SMF 30 with the UL message from the UE 10 together with the identity of the UE 10 as well as with a notification of the Access Type of the access where this message has been received.

In step S204, when the processor 100 of the SMF 30 needs to send a DL message to the UE 10 or to activate/de-activate a PDU session (via N2 request to the AN), the processor 100 of the SMF 30 determines the suitable Access Type to use, which may be constrained for example by:

II.A. The access over which the corresponding UL message has been received (when the DL message is a response to an UL message).

II.B. Access policies negotiated with the UE 10 (e.g. at PDU session establishment).

In step S204, the processor 100 of the SMF 30 sends an N11 (interface between AMF/SMF) request towards the AMF that may include.

III.A. A reference to the UE 10 identity and "Access Type requirements" i.e. constraints on the Access Type to use to reach the UE 10, indicating for instance a unique access type, a set of allowed Access Types (that may be prioritized), or the absence of constraint on the Access Type that may be used.

III.B. Optionally, a N1 (interface between UE/AMF) SM message that should be forwarded to the UE 10.

III.C. Optionally, a N2 request that should be forwarded to the AN over which to activate/de-activate a PDU session.

In step S206a, if the UE 10 is already CM-CONNECTED on one of the access type(s) indicated or implied as allowed in the N11 request (this means a communication channel is setup with the UE 10 on that access), the AMF delivers the DL N1 message via this access. If there are multiple access networks available (i.e. which are allowed by the N11 request message and for which the UE is connected), the AMF 30 selects an access network according to the configured information, e.g., network policy.

In step S206b, if the processor 100 of the AMF 20 can page the UE 10 on one (or more) of the access types indicated or implied as allowed in the N11 request, the processor 100 of the AMF 20 pages the UE 10 on such access and when the UE 10 gets CM-CONNECTED delivers the DL N1 message or N2 request via this access.

In step S206c, if the processor 100 of the AMF 20 cannot access the UE 10 via the access types indicated or implied as allowed in the N11 request, the processor 100 of the AMF 20 can attempt to notify (e.g. by paging, as described in step V.A below, or by a NAS message, as described is step V.B. below) the UE 10 on an access not indicated or implied as allowed in the N11 request.

In step S208, the processor 100 of the UE 10, upon reception of the notifying message in step 206c, may then try to get CM-CONNECTED over an access previously negotiated with SMF as allowed for the corresponding PDU session.

In step S210, then the AMF can send a DL SM message or user data via allowed access type.

In some example embodiments, the following may be implemented, as follows.

In step S206c, there is a scenario where the UE 10 is not CM-CONNECTED over non-3GPP access and DL traffic arrives for a PDU session that is not allowed over 3GPP access.

V.A. In an embodiment, it is possible to page the UE 10 over 3GPP access and to indicate to the processor 100 of the UE 10 why (e.g. providing the PDU session Id=an identifier of a PDU session). This paging can contain the PDU session Id and may induce the UE 10 to become CM-CONNECTED over non-3GPP (when policies restrict the UE from using the 3GPP access for this PDU session Id; as shown in step S208).

V.B. The UE CM-CONNECTED over 3GPP access, where the UE 10 cannot be paged as it is already CM-CONNECTED. In this scenario, the network sends over 3GPP access a NAS signaling message. The message can be such that it commands the UE 10 to get CM-CONNECTED over another access (indicating the reason=the PDU session Id; as shown in step S208).

Figure 3:
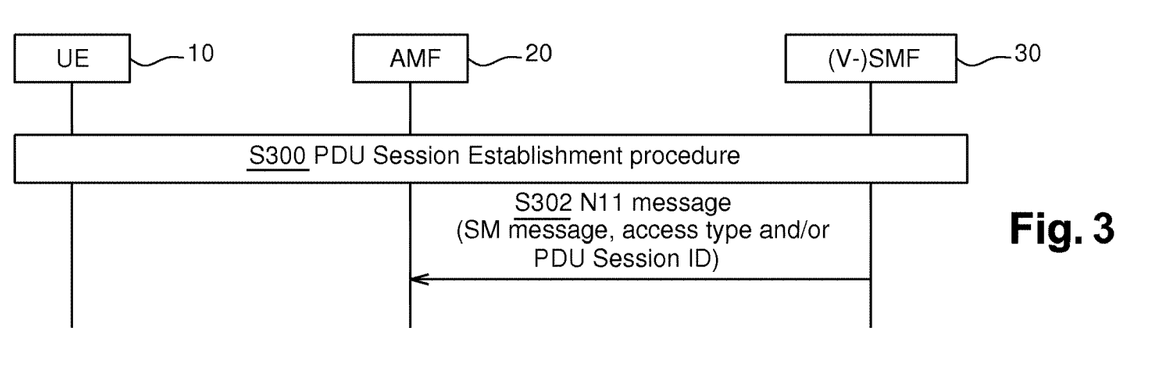
FIG. 3 illustrates a communication diagram for a method of another session management procedure, in accordance with an example embodiment.

FIG. 3 illustrates a communication diagram for a method of another session management procedure, in accordance with an example embodiment. This method is described as being performed by the processor 100 of the network node (processing device) 10 of FIG. 1, though it should be understood that, within the context of this description, a collection of processors 100 are performing these steps. Namely, the processors 100 for each of the apparatus or UE 10, AMF 20 and SMF 30 are collectively performing the steps of this method.

In step S300, during the PDU session establishment procedure, the processor 100 of the AMF 20 receives the access technology type information via N2 and the PDU session ID from the UE 10. The processor 100 of the AMF 20 may associate the access technology type information with the PDU session ID.

In step S302, the processor 100 of the SMF 30 may send an N11 message towards the AMF 20 that includes a SM message that should be forwarded to the UE 10. In addition, the N11 message may further include the PDU session ID.

In step S302, if the PDU session ID is included in the N11 message, the processor 100 of the AMF 20 shall search the association information between the access technology type information and the PDU session ID (created during the PDU session establishment procedure), and choose the access network according to the association information (e.g., if the PDU session ID is associated with the 3GPP access network, the SM message is sent via the 3GPP access network; otherwise if the PDU session ID is associated with the non-3GPP access network, the SM message is sent via the non-3GPP access network).

The instant example embodiments can be extended to other type of messages, other than SM (e.g. location service messages).

Scenario 2: SMS Messages

Figure 4:
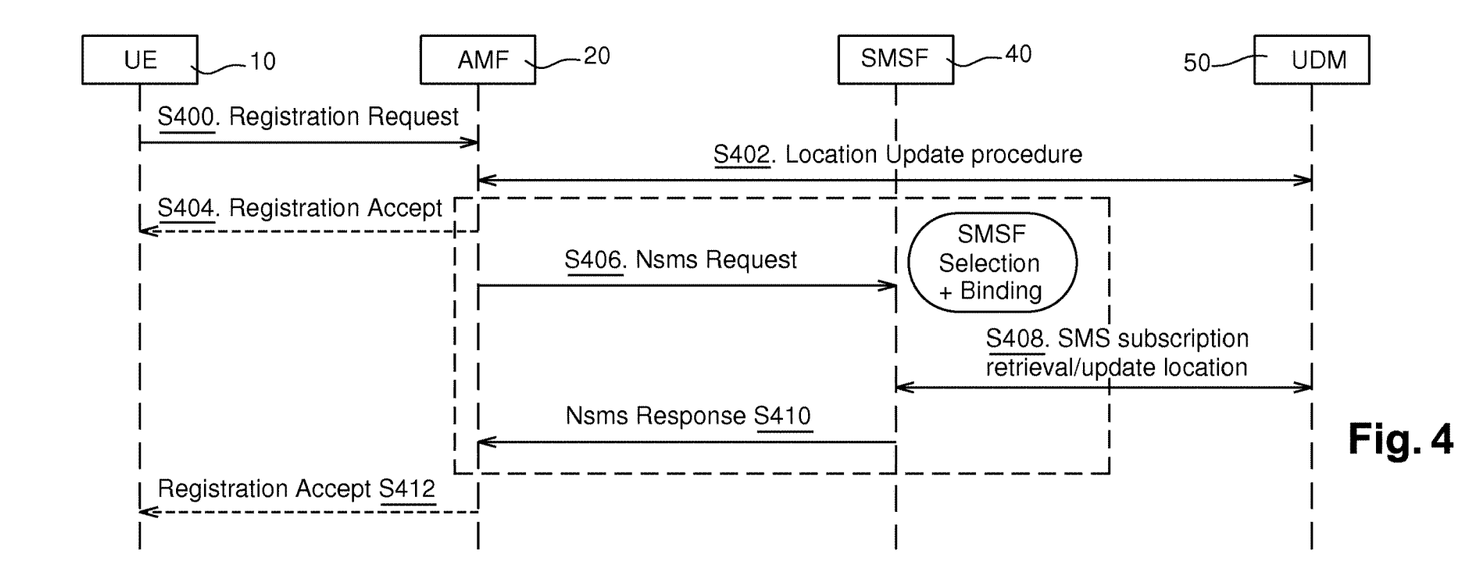
FIG. 4 illustrates a communication diagram for a method of a registration procedure for a short message service, in accordance with an example embodiment.

FIG. 4 illustrates a communication diagram for a method of a registration procedure for a short message service, in accordance with an example embodiment. This method is described as being performed by the processor 100 of the network node (processing device) 10 of FIG. 1, though it should be understood that, within the context of this description, a collection of processors 100 are performing these steps. Namely, the processors 100 for each of the apparatus or UE 10, AMF 20, SMSF 40 and UDM 50 are collectively performing the steps of this method.

In step S400, to enable SMS over NAS transporting, the processor 100 of the UE 10 includes an "SMS supported" indication in a registration request message indicating the UE's 10 capability for SMS over a non-access stratum (NAS) transport. In addition, the processor 100 of the UE 10 indicates that the SMS messages can be sent to the UE 10 via multiple access networks.

In step S402, the processor 100 of the AMF 20 perform an update location procedure with the processor 100 of the UDM 50. If the "SMS supported" indication is included in the registration request message, the processor 100 of the AMF 20 checks SMS subscription from the UDM 50 for the UE 10 on whether the SMS service is allowed to the UE 10. If yes, the processor 100 of the AMF 20 discovers and selects an SMSF 40 to serve the UE 10.

In step S404, the processor 100 of the AMF 20 includes the "SMS supported" indication to the UE 10 in the Registration Accept message if the processor 100 of the AMF 20 has selected an SMSF. Or else, in step S406 the processor 100 of the AMF 20 includes the "SMS supported" indication to the UE 10 in the Registration Accept message only after step S410 in which the processor 100 of the AMF 20 has received a positive indication from the selected SMSF 40.

The Registration Accept message (sent in steps S404 or S412) may confirm whether the SMS message delivery via multiple access networks is allowed.

If the SMS message delivery via multiple access networks is indicated by the UE 10 and accepted by the AMF 20, the processor 100 of the AMF 20 selects the access network that will deliver the DL SMS messages. The processor 100 of the AMF 20 may take into account the CM state for each of the access networks.

Otherwise the SMS message delivery via multiple access networks is not allowed or not requested by the UE 10, the AMF 20 shall ensure that DL SMS messages are delivered via the access network through which the registration procedure for SMS over NAS is made.

In step S406, the processor 100 of the AMF 20 invokes SMS activation service from the SMSF 40. The request includes the AMF 20 address and subscription permanent identifier (SUPI). The processor 100 of the AMF 20 uses the SMSF 40 address from step S402.

In step S406, the processor 100 of the SMSF 40 retrieves the SMS related subscription with update location procedure with the UDM. The processor 100 of the SMSF 40 also creates an UE 10 context to store the SMS subscription information and the AMF 20 address that is serving this UE 10. The UDM stores the SMSF 40 address for short message terminating routing.

In step S410, the processor 100 of the SMSF 40 responds back to the AMF 20 with a response message. The processor 100 of the AMF 20 stores the SMSF 40 address received as part of the UE 10 context.

Figure 5:
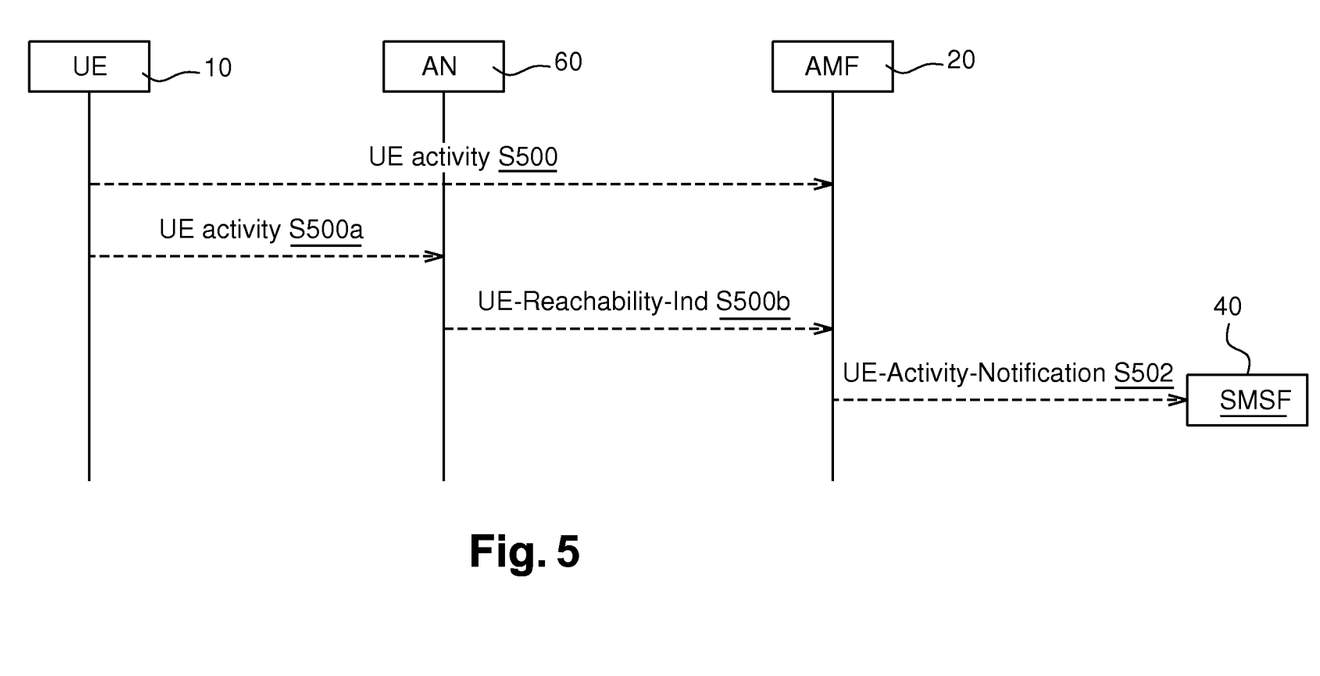
FIG. 5 illustrates a communication diagram for a method of a user equipment (UE) activity procedure, in accordance with an example embodiment.

FIG. 5 illustrates a communication diagram for a method of a user equipment (UE) 10 activity procedure, in accordance with an example embodiment. This method is described as being performed by the processor 100 of the network node (processing device) 10 of FIG. 1, though it should be understood that, within the context of this description, a collection of processors 100 are performing these steps. Namely, the processors 100 for each of the apparatus or UE 10, AMF 20, SMSF 40 and access node (AN) 60 are collectively performing the steps of this method.

In step S500, the AMF 20 receives an indication regarding UE 10 reachability, e.g. a Registration Request or Service Request message from the processor 100 of the UE 10, or a UE 10 Reachability Indication from the access network.

In step S502, if the AMF 20 contains an mobility management (MM) context of the UE 10 and if UE reachability request parameter for AMF (URRP-AMF) for that UE 10 is configured to report once that the UE 10 is reachable, the processor 100 of the AMF 20 shall send a UE-Activity-Notification (Permanent ID, UE-Reachable) message to SMSF 40 and clears the corresponding URRP-AMF for that UE 10.

If the SMS message delivery via multiple access networks is indicated by the UE 10 and accepted by the processor 100 of the AMF 20 during the registration procedure for SMS over NAS, the processor 100 of the AMF 20 shall take into account the CM states of multiple access networks (AN) 60 whether the UE 10 is reachable (as shown in steps S500a/S500b).

Figure 6:
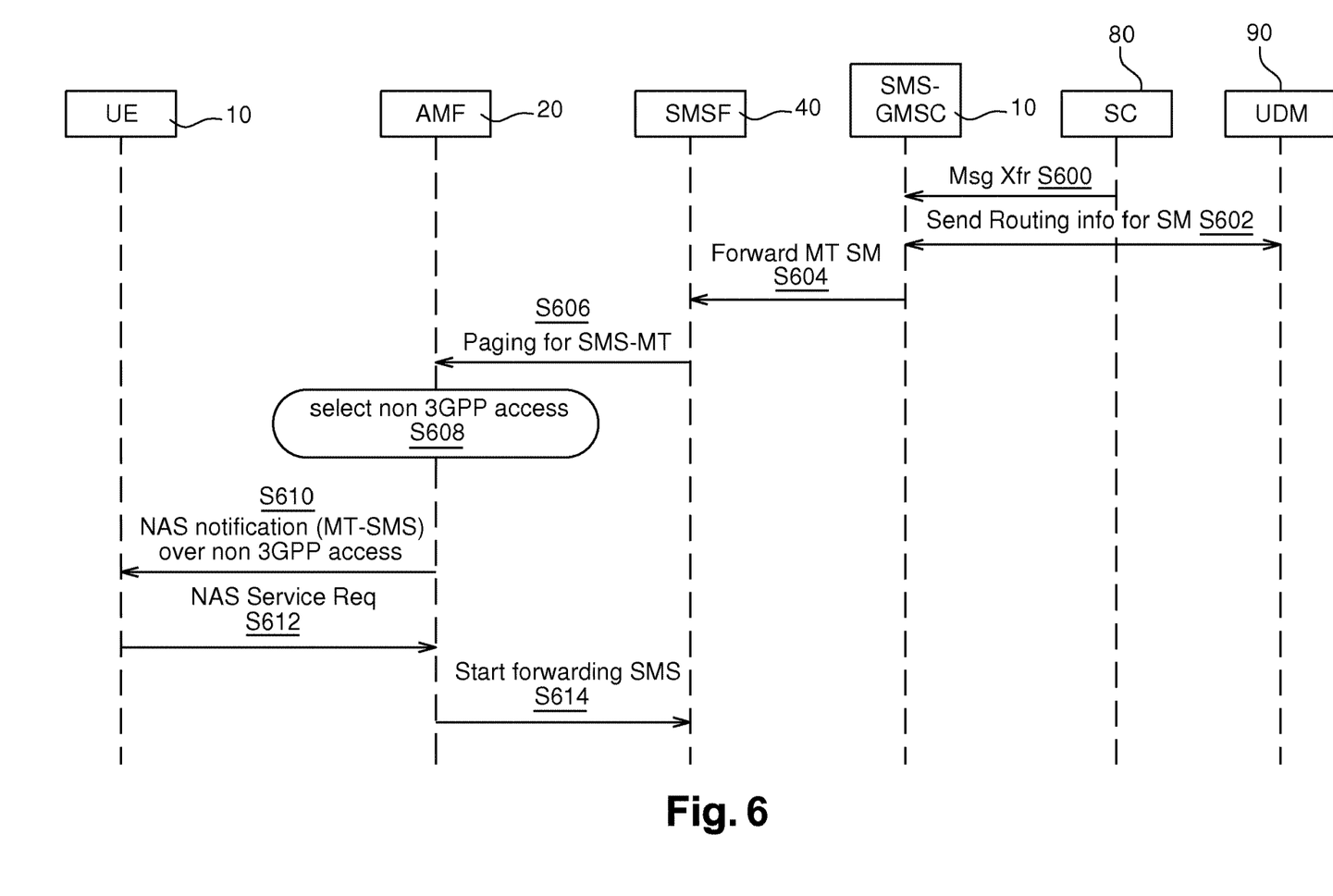
FIG. 6 illustrates a communication diagram for a method of a user equipment (UE) short message service procedure over a non-access stratum for non-3GPP access, in accordance with an example embodiment.

FIG. 6 illustrates a communication diagram for a method of a user equipment (UE) short message service procedure over a non-access stratum for non-3GPP access, in accordance with an example embodiment. This method is described as being performed by the processor 100 of the network node (processing device) 10 of FIG. 1, though it should be understood that, within the context of this description, a collection of processors 100 are performing these steps. Namely, the processors 100 for each of the apparatus or UE 10, AMF 20, SMSF 40, short message service gateway mobile switching center (SMS-GMSC) 70, switching center (SC) 80 and UDM 90 are collectively performing the steps of this method.

In steps S600, S602 and S604 the processor 100 of the UE (mobile terminal, or MT) 10 SMS interaction between SC 80/SMS-GMSC 70/UDM 90 follows the procedure defined in 3GPP TS 23.040.

In step S606, the processor 100 of the SMSF 40 sends SMS paging request to the AMF 20 via N20. The SMS message includes a UE 10 ID and SMS-MT indication.

In step S608, the processor 100 of the AMF 20 determines an access network to convey MT-SMS based on operator policy and/or "SMS supported" indication (such as for example, if the "SMS supported" indication was sent via the registration accept message and the operator allows sending an SMS via different access through which the UE made registration, select non-3GPP access if the UE 10 is CM-IDLE on the 3GPP access).

In steps S610, S612 and S614, the processor 100 of the UE 10 is notified of the pending MT-SMS, performs a service request procedure, and exchanges SMS related messages with the 5GC.

Based on the example embodiments described above, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium, such as anontransitory storage medium. A processor(s) may perform the necessary tasks.

Specific structural and functional details disclosed herein are merely representative for purposes of describing example embodiments. This invention may, however, be embodied in many alternate forms and should not be construed as limited to only the embodiments set forth herein.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. An apparatus comprising
at least one processor; and
at least one memory including computer program code;
the at least one memory and the computer program code configured to, with the at least one processor, cause the apparatus at least to perform:
receive, over a third generation partnership project access, a notifying message regarding non-third generation partnership project access, the apparatus being simultaneously registered to a communication network via the third generation partnership project access and via the non-third generation partnership project access and the apparatus being served both via the third generation partnership project access and via the non-third generation partnership project access by a respective access and mobility management function (AMF),
said apparatus being in a connection management-idle state over the non-third generation partnership project access.

2. The apparatus of claim 1, wherein said notifying message includes a paging message if the apparatus is also in a connection management-idle state over the third generation partnership project access.

3. The apparatus of claim 1, wherein said notifying message includes a non-access stratum signaling message if the apparatus is in a connection management-connected state over the third generation partnership project access.

4. The apparatus of claim 1, wherein said notifying message is received regarding a packet data unit session to be activated.

5. The apparatus of claim 1, wherein an indication regarding a packet data unit session to be activated is contained in said notifying message.

6. The apparatus of claim 1, the at least one memory and the computer program code configured to, with the at least one processor, cause the apparatus at least to perform:
send a registration request indicating that short message service messages can be delivered to the apparatus via multiple access types, and
receive a registration accept message confirming that short message service messages are allowed to be delivered via multiple access types.

7. The apparatus of claim 6, wherein the multiple access types include a third generation partnership project access and a non-third generation partnership project access.

8. The apparatus of claim 1, wherein the at least one memory and the computer program code are further configured to, with the at least one processor, cause the apparatus to attempt to establish a CM-CONNECTED state over an access previously negotiated with a network function in response to the notifying message received from the AMF.

9. The apparatus of claim 1, wherein the notifying message comprises a protocol data unit (PDU) session ID associated with the non-third generation partnership project access, and wherein receipt of the notifying message comprising the PDU session identifier (ID) induces user equipment comprising the apparatus to become CM-CONNECTED via the non-third generation partnership project access.

10. The apparatus of claim 9, wherein the at least one memory and the computer program code are configured to, with the at least one processor, cause the apparatus to receive the notifying message that provides the PDU session ID by receiving a paging message via the third generation partnership project access.

11. The apparatus of claim 1, wherein the apparatus is embodied by user equipment (UE).

12. An apparatus comprising:
at least one processor; and
at least one memory including computer program code;
the at least one memory and the computer program code configured to, with the at least one processor, cause the apparatus at least to perform:
receive, over a non-third generation partnership project access, a notifying message regarding a third generation partnership project access, the apparatus being simultaneously registered to a communication network via the third generation partnership project access and via the non-third generation partnership project access, said apparatus being in a connection management-idle state over the third generation partnership project access and in a connection management-connected state over the non-third generation partnership project access and the apparatus being served both via the third generation partnership project access and via the non-third generation partnership project access by a respective access and mobility management function (AMF), and,
send, over the third generation partnership project access, a service request message.

13. The apparatus of claim 12, wherein said notifying message is received regarding a packet data unit session to be activated.

14. The apparatus of claim 12, wherein an indication regarding a packet data unit session to be activated is contained in said notifying message.

15. The apparatus of claim 12, the at least one memory and the computer program code configured to, with the at least one processor, cause the apparatus at least to perform:
send a registration request indicating that short message service messages can be delivered to the apparatus via multiple access types, and
receive a registration accept message confirming that short message service messages are allowed to be delivered via multiple access types.

16. The apparatus of claim 12, wherein the at least one memory and the computer program code are further configured to, with the at least one processor, cause the apparatus to attempt to establish a CM-CONNECTED state over an access previously negotiated with a network function in response to the notifying message received from the AMF.

17. The apparatus of claim 12, wherein the notifying message comprises a protocol data unit (PDU) session ID associated with the non-third generation partnership project access, and wherein receipt of the notifying message comprising the PDU session identifier (ID) induces user equipment comprising the apparatus to become CM-CONNECTED via the non-third generation partnership project access.

18. The apparatus of claim 17, wherein the at least one memory and the computer program code are configured to, with the at least one processor, cause the apparatus to receive the notifying message that provides the PDU session ID by receiving a paging message via the third generation partnership project access.

19. The apparatus of claim 12, wherein the apparatus is embodied by user equipment (UE).

20. A method, comprising:
receiving over a third generation partnership project access, a notifying message regarding non-third generation partnership project access, related to a user equipment being simultaneously registered to a communication network via the third generation partnership project access and via the non-third generation partnership project access, wherein the user equipment is served, by a respective access and mobility management function (AMF), both via the third generation partnership project access and via the non-third generation partnership project access, and
the user equipment being in a connection management-idle state over the non-third generation partnership project access.

21. The method of claim 20, wherein said notifying message includes a paging message if the user equipment is also in a connection management-idle state over the third generation partnership project access.

22. The method of claim 20, wherein said notifying message includes a non-access stratum signaling message if the user equipment is in a connection management-connected state over the third generation partnership project access.

23. The method of claim 20, wherein said notifying message is received regarding a packet data unit session to be activated.

24. The method of claim 20, wherein an indication regarding a packet data unit session to be activated is contained in said notifying message.

25. The method of claim 20, further comprising attempting to establish a CM-CONNECTED state over an access previously negotiated with a network function in response to the notifying message received from the AMF.

26. The method of claim 20, wherein the notifying message comprises a protocol data unit (PDU) session ID associated with the non-third generation partnership project access, and wherein receipt of the notifying message comprising the PDU session identifier (ID) induces the user equipment to become CM-CONNECTED via the non-third generation partnership project access.

27. The method of claim 26, wherein receiving the notifying message that provides the PDU session ID comprises receiving a paging message via the third generation partnership project access.

28. A method, comprising:
receiving over a non-third generation partnership project access, a notifying message regarding a third generation partnership project access, related to a user equipment being simultaneously registered to a communication network via the third generation partnership project access and via the non-third generation partnership project access, said user equipment being in a connection management-idle state over the third generation partnership project access and in a connection management-connected state over the non-third generation partnership project access, wherein the user equipment is served, by a respective access and mobility management function (AMF), both via the third generation partnership project access and via the non-third generation partnership project access, and
sending over the third generation partnership project access, a service request message.

29. The method of claim 28, wherein said notifying message is received regarding a packet data unit session to be activated.

30. The method of claim 28, wherein an indication regarding a packet data unit session to be activated is contained in said notifying message.

31. The method of claim 28, comprising:
sending a registration request indicating that short message service messages can be delivered to the user equipment via multiple access types, and
receiving a registration accept message confirming that short message service messages are allowed to be delivered via multiple access types.

32. The method of claim 28, further comprising attempting to establish a CM-CONNECTED state over an access previously negotiated with a network function in response to the notifying message received from the AMF.

33. The method of claim 28, wherein the notifying message comprises a protocol data unit (PDU) session ID associated with the non-third generation partnership project access, and wherein receipt of the notifying message comprising the PDU session identifier (ID) induces the user equipment to become CM-CONNECTED via the non-third generation partnership project access.

34. The method of claim 33, wherein receiving the notifying message that provides the PDU session ID comprises receiving a paging message via the third generation partnership project access.

* * * * *